(12) United States Patent
Dinkel et al.

(10) Patent No.: US 7,390,174 B2
(45) Date of Patent: Jun. 24, 2008

(54) PISTON PUMP

(75) Inventors: Dieter Dinkel, Schwalbach (DE); Albrecht Otto, Schöneck (DE); Georg Sonnenschein, Eschborn (DE); Hans-Georg Zentgraf, Rüsselsheim (DE); Kristian Tarandek, Neu-Isenburg (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 437 days.

(21) Appl. No.: 11/248,119

(22) Filed: Oct. 12, 2005

(65) Prior Publication Data

US 2006/0083629 A1 Apr. 20, 2006

(51) Int. Cl.
*F04B 39/10* (2006.01)
*B06T 8/40* (2006.01)

(52) U.S. Cl. ............... 417/549; 417/273; 417/569; 417/570; 303/116.4; 303/10; 303/11

(58) Field of Classification Search ............ 417/273, 417/545–572; 303/116.4, 10, 11; 137/529, 137/539, 539.5; 251/337; 92/78, 170.1
See application file for complete search history.

(56) References Cited

U.S. PATENT DOCUMENTS

| 5,722,738 | A | * | 3/1998 | Beck et al. ............... 303/116.4 |
| 6,042,350 | A | * | 3/2000 | Beck ........................ 417/549 |
| 6,109,896 | A | * | 8/2000 | Schuller et al. ............ 417/549 |
| 6,171,083 | B1 | * | 1/2001 | Schuller ..................... 417/549 |
| 6,474,963 | B1 | * | 11/2002 | Wetzel et al. ............... 417/549 |
| 6,523,524 | B1 | * | 2/2003 | Simon ........................ 123/450 |
| 6,901,844 | B2 | * | 6/2005 | Djordjevic .................... 92/72 |
| 6,935,113 | B2 | * | 8/2005 | Pagot et al. .................. 60/589 |
| 2001/0048884 | A1 | * | 12/2001 | Siegel et al. ............... 417/470 |

FOREIGN PATENT DOCUMENTS

| DE | 10346237 | 9/2004 |
| EP | 0734494 | 5/2003 |

* cited by examiner

*Primary Examiner*—Ninh Nguyen
*Assistant Examiner*—Amene S Bayou

(57) ABSTRACT

A piston pump (10) for a hydraulic consumer of an electronically controlled vehicle brake system, carries a stepped piston (50, 50') and centers a sealing assembly (26, 26') which is retained in an axial direction Ax by a step (52, 52') on the stepped piston (50, 50'), on the one hand, and is retained by a spring cage (53, 53'), on the other hand. The stepped piston (50, 50') includes a plane support (54, 54') for plane support legs (55a,b,c; 55a,b,c') of the spring cage (53, 53') The stepped piston (50, 50') includes radially inwards, with respect to the support (54, 54'), a stepped bore (56, 56'), with the bore (56, 56') accommodating centering legs (57a,b,c; 57a,b,c') of the spring cage (53, 53'). Coaxially as well as inside the stepped bore (56, 56'), a spring-loaded valve member (59, 59') of a non-return valve is arranged. A resetting spring (38) is supported on an abutment (41) of the bushing (18, 19) on the one hand and on the spring cage (53, 53') on the other hand The bushing (18, 19) is provided with a stop (63, 63') for the stepped piston (50, 50'), so that stepped piston (50, 50'), resetting spring (38), non-return valve, and sealing assembly (26) are arranged within the bushing (18, 19) as a subassembly that can be handled independently.

14 Claims, 6 Drawing Sheets

PISTON PUMP

BACKGROUND OF THE INVENTION

The present invention relates to a piston pump for supplying pressure fluid into a hydraulic consumer of an electronically controlled vehicle brake system. This consumer may principally concern at least one vehicle brake, or a master cylinder, or a pressure fluid reservoir, or a pressure fluid accumulator. A supply of several of the mentioned consumers or a supply of combinations of the mentioned consumers is basically possible.

In prior art piston pumps a piston is movably arranged in a stepped bore of an accommodating member. The piston is guided directly in the accommodating member, and non-return valves are provided which are used for the ventilation of a working chamber. The working chamber is limited by the piston. A resetting spring is supported in the working chamber on the piston between an abutment and a spring retainer. The stepped bore is isolated from the ambience by means of a closing member.

EP 0 734 494 B2 discloses a piston pump whose piston is guided directly in the pump housing. The spring cage for the valve components is configured as a sheet-metal shaped part in such a fashion that the piston, the resetting spring, and a valve subassembly are secured in relation to each other as a subassembly which can be handled independently. This special provision renders it possible to rationalize a bushing which brings about the cohesion of the components of a piston pump.

However, the piston pump according to EP 0 734 494 B2 suffers from the major shortcoming that its axial overall length needs improvement. The degree of miniaturization is not sufficient. One reason therefor can be seen in that pump piston and non-return valves are serially arranged in an axial direction. Further, the special function of the spring cage necessitates an axial attachment portion which extends externally over a front part of the pump piston and engages radially from the outside into a groove of the pump piston in positive engagement therewith. The sealing means must be arranged at an axial distance from the piston end. Finally, the support of the resetting spring on the piston needs improvement because the clip-type attachment of the resetting spring on the spring cage requires the spring cage to be tolerated with high precision and, also, the spring diameter to be tolerated with high precision. This increases the costs of manufacture because especially the resetting spring is a thermally treated metal component which suffers from inevitable changes in dimension due to this heat treatment. To permit a safe cohesion of the related components, it is necessary to tolerate the manufacture to the spring cage with high precision.

An object of the invention is to provide a piston pump having a reduced axial overall length while the support of the resetting spring is improved, and wherein the essential components of the piston pump can nevertheless be mounted in a simple fashion into an accommodating member, grouped as a subassembly in the form of a cartridge.

SUMMARY OF THE INVENTION

This object is achieved in a piston pump comprising the following features: A stepped piston is arranged in a stepped bore of an accommodating member so as to be movable in an axial direction within a bushing, the stepped piston is designed like a hollow tube at least in part; a displacement chamber is limited by an end of the stepped piston and has a stepped design at the outside periphery, and carries and centers a sealing assembly which is retained in an axial direction by a step on the stepped piston, on the one hand, and is retained in an axial direction by a spring cage, on the other hand; the stepped piston includes radially inwards, with respect to the step, a plane support for plane support legs of the spring cage, the stepped piston includes radially inwards, with respect to the support, a stepped bore, with the bore accommodating centering legs of the spring cage; coaxially as well as inside the stepped bore a valve member of a non-return valve is arranged which is used to ventilate the working chamber; a resetting spring is arranged in the displacement chamber and is supported on an abutment of the bushing, on the one hand, and on the spring cage, on the other hand; for forming a pump cartridge that can be handled independently and comprises stepped piston, bushing, resetting spring, non-return valve and sealing assembly, the bushing is provided at one end with a stop for the stepped piston, said stop in a radial direction being configured smaller than the diameter of the stepped piston, while at the opposite end of the bushing at least one separate component is attached as an attachment for the resetting spring. The piston pump of the invention solves the problems referred to hereinabove and, in addition, achieves an improved supply performance at low temperatures because the construction disclosed allows an improved aspiration performance.

To introduce forces in a manner free from bending torques, the plane support has a mean diameter which corresponds basically with the diameter of the piston resetting spring.

To prevent the stepped bore from being damaged by the piston resetting spring, the spring cage includes additional centering legs for the resetting spring.

The material is utilized in a particularly rational manner when the support legs and the centering legs of the spring cage are alternately provided in a circumferential direction.

A statically defined introduction of force and a support of components are achieved when at least three support legs and at least three centering legs are provided in each case.

Metal forming manufacturing processes are facilitated because the centering legs for the resetting spring and the centering legs for the spring cage are arranged in each case at right angles relative to the support legs.

A particularly space-saving arrangement is rendered possible because the centering legs for the spring cage and the centering legs for the resetting spring point in diametrically opposed directions.

Assembly problems are solved when the centering legs for the spring cage and the centering legs for the helical resetting spring have an integral design, with the centering legs for the resetting spring being able to engage radially inwards into the resetting spring or extend over the spring windings in a radially outward direction.

The spring cage can be optimized for use in piston pumps being small in diameter or large in diameter. Thus, the preferred variant for large diameters is characterized in that the centering legs for the spring cage and the centering legs for the resetting spring are designed separately, with the centering legs for the resetting spring extending radially outwards over it. A solution which is employed preferably in small-diameter piston pumps is characterized in that each centering leg fulfills several tasks, includes a resiliently elastic spring portion, and with the spring legs engaging into the interior of the piston resetting spring.

To extend the useful life of the non-return valve and enhance the safety of preventing spring fracture, the spring cage has means limiting an opening stroke of the valve member. To allow metal forming manufacture, the means are designed as legs against which the valve member will bear after a defined opening stroke. The legs are arranged so as to be distributed in a circumferential direction for a statically defined support. However, the invention is in no way limited to stroke-limiting means formed by legs. Any constructive design performing this function is herewith expressly included in the scope of the invention.

A particularly low-cost variant of the invention is characterized in that the spring cage is configured as an integral sheet-metal shaped part, that the material of the spring cage has a uniform thickness, and that the legs and the stops are provided as punched-out jogs or impressions of the sheet-metal shaped part.

The invention will be described in more detail in the following by way of preferred embodiments represented in the accompanying drawings.

DETAILED DESCRIPTION OF THE DRAWINGS

Figure 1:
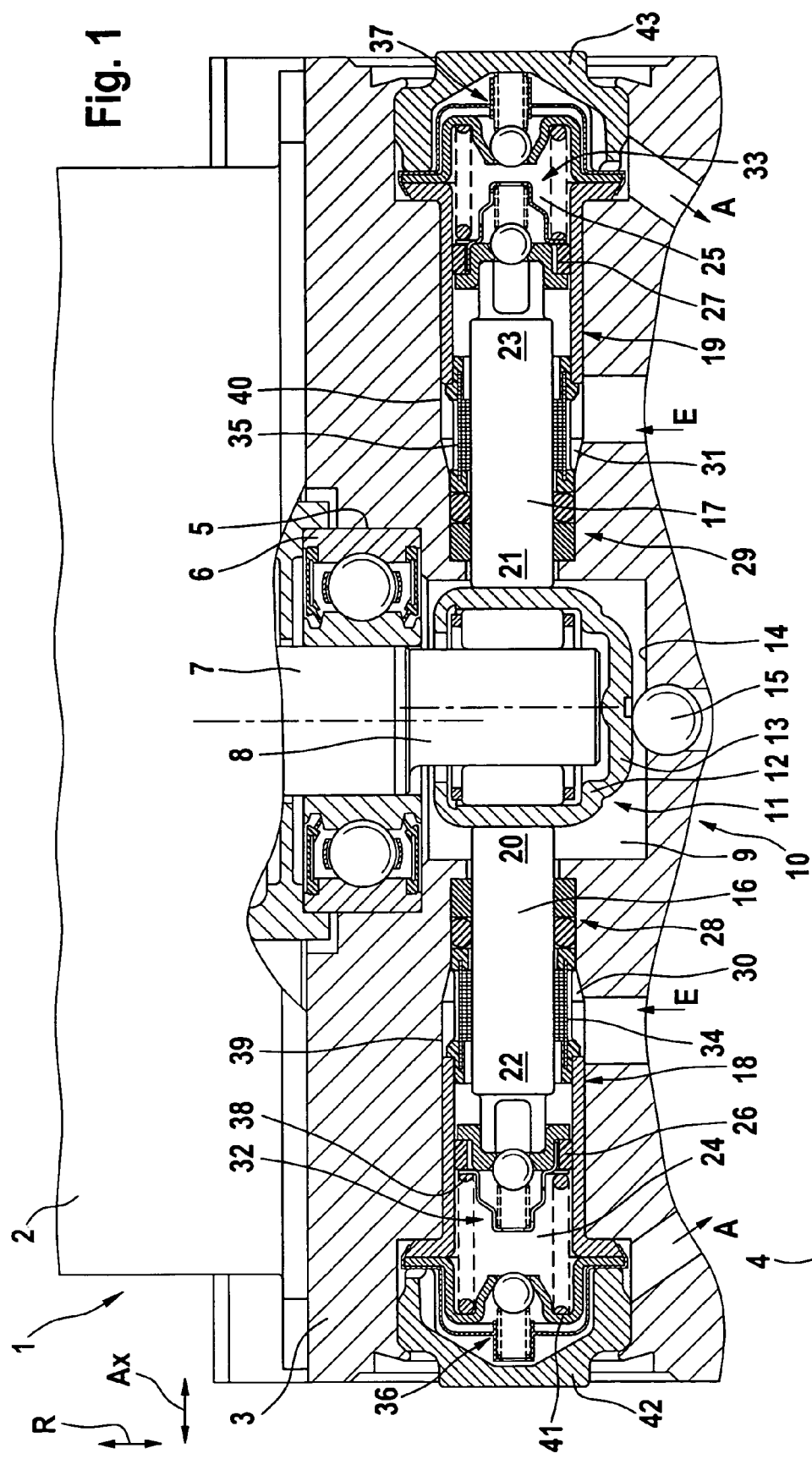
FIG. 1 shows an enlarged cross-sectional view of a prior-art unit with a piston pump according to DE 103 46 237.6.

FIG. 1 relates to a unit 1 with a schematically sketched drive 2, in particular an electric motor, which is flanged on one side to an accommodating ember 3 for electromagnetically operable valves, ducts, accumulator or damper chambers, and a piston pump 10. An electronic control unit 4, which is illustrated only schematically, is provided on an opposite side of the accommodating member 3.

The illustrated unit 1 serves in particular for the slip control or driving stability control of motor vehicles. Brake systems of this type are often referred to by using abbreviations such as ABS, TCS, ESP or DDC (driving dynamics control). The piston pump in the brake system is e.g. used to return brake fluid out of a wheel brake cylinder or several wheel brake cylinders into a master brake cylinder (ABS) and/or to supply brake fluid out of a supply reservoir into a wheel brake cylinder or into several wheel brake cylinders (TCS, ESP). The piston pump is required e.g. in a brake system with slip control and/or in a brake system (ESP, DDC) serving as a steering aid. Slip control is e.g. used to prevent locking of the wheels of the vehicle during a braking operation when strong pressure is applied to a brake pedal and/or to prevent the spinning of driven wheels of the vehicle. Thus, ABS results in an unrestricted steerability of the vehicle at a high rate of deceleration and avoids tendencies to swerving. Electronic brake torque control for the wheels of the vehicle is rendered possible.

In a brake system which is used as a steering aid (ESP), brake pressure is built up in one or more wheel brake cylinders independently of an actuation of the brake pedal or accelerator pedal in order to prevent the vehicle from breaking away from a lane intended by the driver or from rolling over (roll-over prevention), for example.

A stepped bore 5 of the accommodating member 3 accommodates a sealed roller bearing 6 of a drive shaft 7, the free end of which shaft is designed as an eccentric 8 and projects into a crank chamber 9 of the stepped bore 5. It is principally possible that the eccentric 8 is ground directly to the drive shaft 7 or motor shaft, or is designed as a separate structural element and attached to the drive shaft 7. After an increased pump lifetime it may happen that the crank chamber 9 is flooded with leakage fluid, in particular with brake fluid, and a reservoir connected to the crank chamber 9 may be used to receive fluid within drive 2, within the accommodating ember 3 or within the electronic control unit 4.

The eccentric 8 is provided with a needle bearing 11 closed on one side by a bowl-shaped outside ring 12, the bowl bottom 13 thereof with a wart-like projection being movable into abutment on an end face of the drive shaft in a point-by-point and low-friction manner. A bottom 14 of the crank chamber 9 has a ball 15 so that the rotating bowl bottom 13 with an outside surface remote from the motor shaft bears against the ball 15 in a low-friction manner. The outside ring 12 that can be rotated relative to the accommodating member 3 thus does not have any direct contact to the material of the accommodating member 3 so that the accommodating member will not encounter chip removal due to rotation. This prevents the accommodating member 3 from being stressed by friction without having to apply wear-resistant material coatings such as anodic oxidation to walls of an aluminum accommodating member 3.

As shown in FIG. 1, two multi-part stepped pistons 16, 17 of the piston pump 10 are guided and arranged within a stepped bore 39, 40 so as to be movable in a bushing 18, 19, they extend with a first hydraulic diameter through a supply chamber 30, 31 and reach with an end 20, 21 into a crank chamber 9 where they contact the periphery of the outside ring 12. Another slotted end 22, 23 of the pistons 16, 17 includes a second hydraulically effective diameter and limits a displacement chamber 24, 25. While the second end 22, 23 of the pistons 16, 17 is guided and sealed in the bushing 18, 19 by way of a guiding and sealing ring 26, 27, another guiding and sealing assembly 28, 29 allows the arrangement of the supply chamber 30, 31 between the said sealing assembly 28, 29 and a non-return valve 32, 33 acting as a suction valve. A piston resetting spring 38 is firmly supported on the side of the accommodating member and acts upon the stepped piston 16, 17. Pressure fluid propagates from a pressure fluid inlet E through a duct and a filter 34, 35 provided at a sleeve into the supply chamber 30, 31. In the suction cycle, the pressure fluid is conducted into the displacement chamber 24, 25, with the non-return valve (suction valve) 32, 33 open, while in the displacement cycle it is conducted into a pressure fluid outlet A, with the non-return valve (pressure valve) 36, 37 open. It should be added still that the effective hydraulic piston diameter in the displacement chamber 24, 25 along with the hydraulically effective diameter in the supply chamber 30, 31 allows improved aspiration properties with low-viscous pressure fluid. This is because the supply chamber increases when the piston moves in the direction of the upper dead-center (OT), what accelerates the fluid column being aspirated. A novel piston pump according to FIGS. 2 to 7 will be referred to in detail in the following.

A special feature of all preferred embodiments resides in that the spring cage 53, 53' is provided with at least one means 44a, 44b, 44c limiting an opening stroke of the valve member 59. This means 44a, 44b, 44c is preferably designed as but not limited to a mechanical stop for the valve member 59 so that said is blocked by the mentioned stop after a defined opening stroke in order to protect the resetting spring 61 against being overstressed, compressed to coil-bound length, etc. It is possible to configure the means 44a, 44b, 44c as legs. In order that the valve member 59 exhibits a reproducible closing behavior, several stops are distributed over the periphery of the spring cage 53 and at angles relative to each other. An odd number of stops are provided, and principally three stops are favored.

This will achieve the advantage in total that the maximum valve opening stroke of non-return valves is mechanically limited. The fatigue strength of a resetting spring 61 is thereby increased because it is avoided that the spring can be compressed until its coil-bound length. Each stop can be provided as a leg which is punched out as a jog from the bowl-shaped accommodation for the resetting spring 61 and bent in the direction of valve member 59. The result is that each leg extends substantially in parallel to the piston's direction of movement Ax and in the direction of the stepped piston 50. The length of the legs determines the maximally possible stroke of the valve member 59. The legs are disposed on a joint diameter which is considerably smaller than the diameter of the valve member.

Apart from the mentioned leg for forming a stop, further legs may be provided which will be described individually in the following. The legs can be stamped from a circular blank.

Figure 2:
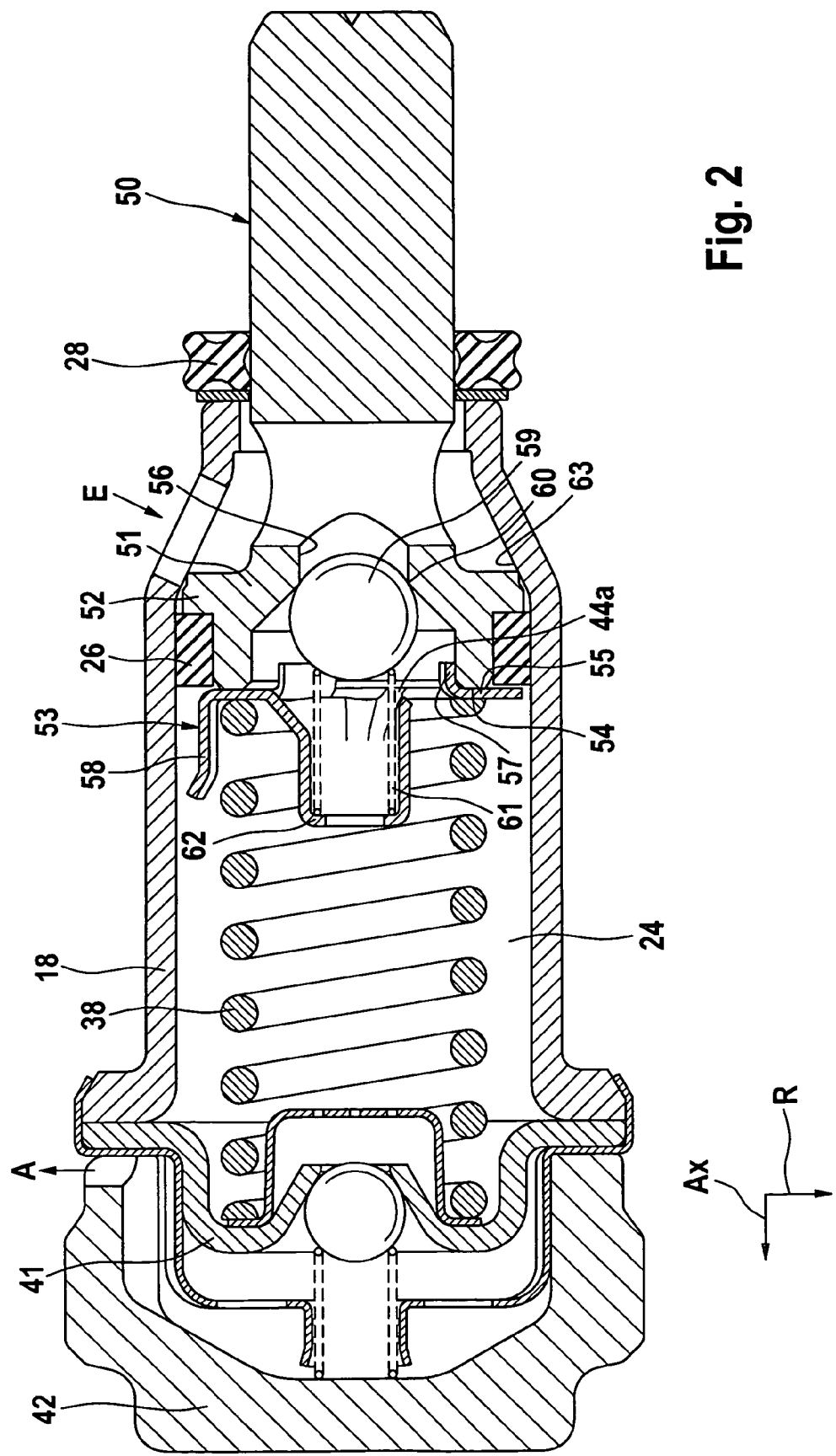
FIG. 2 shows an enlarged cross-sectional view of an improved piston pump.
Figure 3:
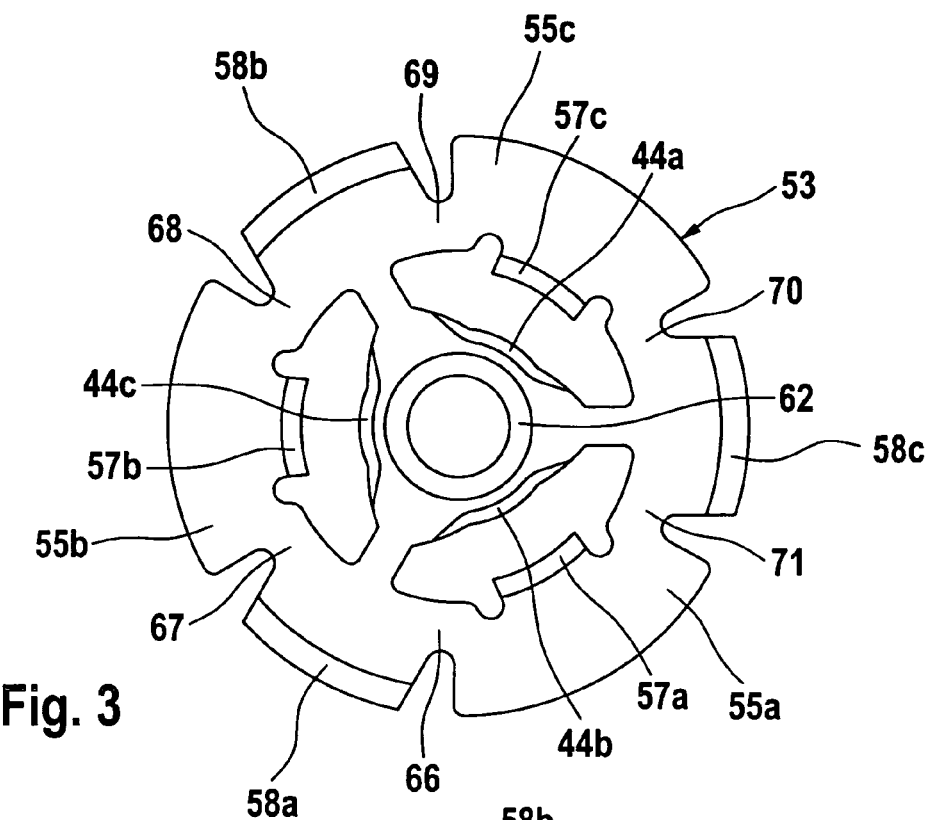
FIG. 3 shows an enlarged view of a spring retainer of the pump according to FIG. 2.
Figure 4:
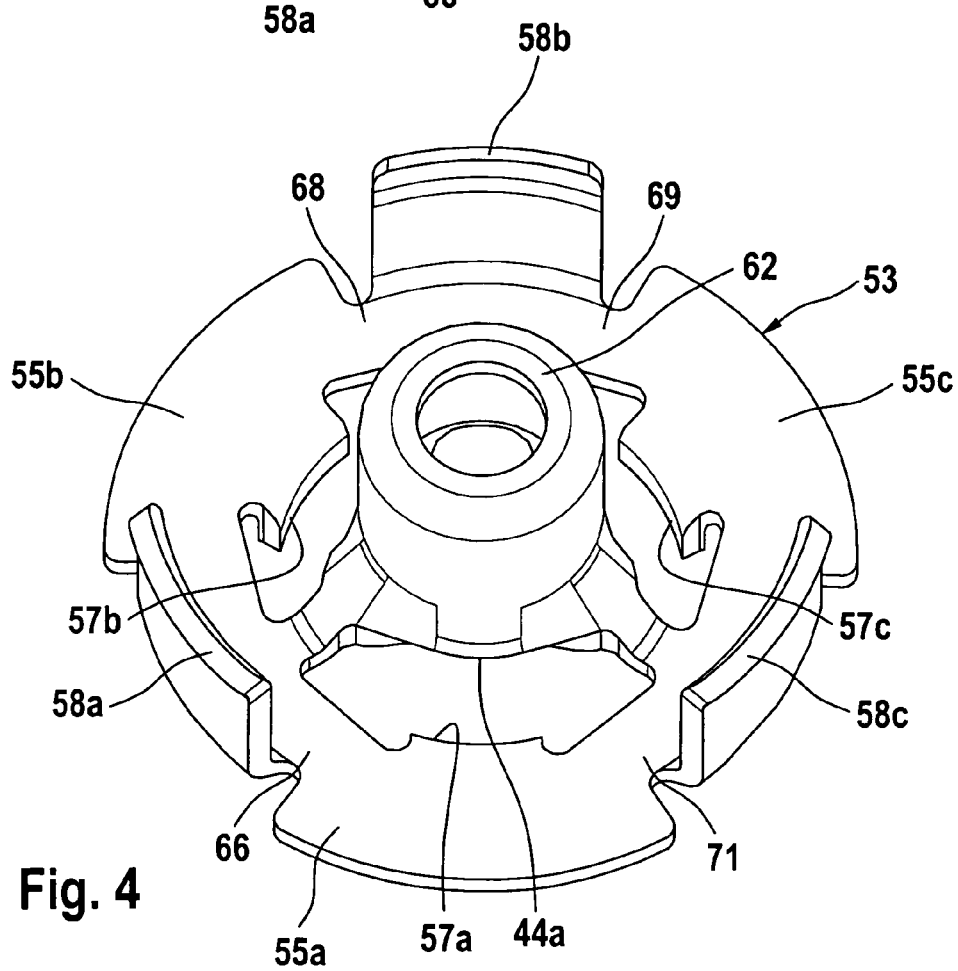
FIG. 4 shows an enlarged perspective view of a spring retainer.

FIGS. 2 to 4 show a first embodiment of a piston pump of the invention, and components consistent with FIG. 1 have been assigned identical reference numerals.

A stepped piston 50 limits a displacement chamber 24 with a tube-like end 51 of hollow design. The corresponding end 51 of the stepped piston 50 has a stepped design at the outside periphery and carries and centers a sealing assembly 26 which is retained in an axial direction by a step 52 on the stepped piston 50, on the one hand, and is retained in an axial direction by a spring cage 53, on the other hand. The spring cage 53 has several tasks in that it secures the sealing assembly 26 in position in an axial direction, on the one hand, is used for force transmission between piston resetting spring 38 and stepped piston 50, and is used for the firm support and accommodation of the resetting spring 61.

Radially inwards with respect to the step 52, the stepped piston 50 has a plane support 54 for plane support legs 55 of the spring cage 53. The plane support 54 on the stepped piston 50 has a mean diameter which is essentially identical with the diameter of the piston resetting spring 38. The result is that only compressive load substantially appears in the support legs 55.

Figure 5:
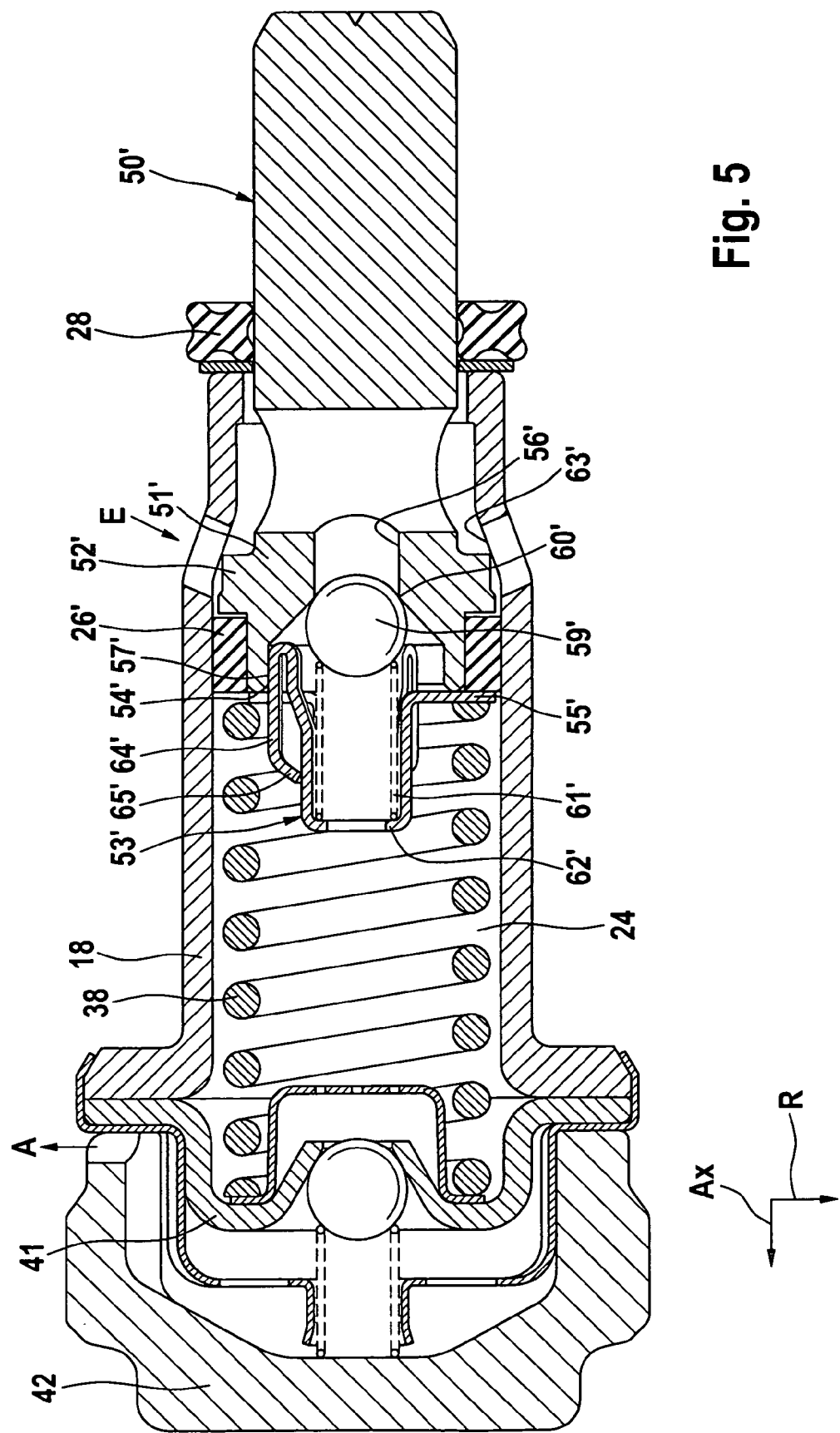
FIG. 5 shows an enlarged cross-sectional view of another embodiment of an improved piston pump.

To configure the described tubular shape, the stepped piston 50 has radially inwards, with respect to the support 54, a stepped bore 56, with said bore 56 accommodating one single, collar-like circumferential centering leg or, as shown in the drawings, several centering legs 57 of the spring cage 53 which are arranged in a circumferential direction curved like cylinder segments. The spring cage 53 is thus centered in a defined manner in relation to the stepped piston 50. As an additional provision the spring cage 53 includes additional centering legs 58 for the piston resetting spring 38. The centering legs 58 can principally be arranged radially outside, as can be seen in FIG. 2, or radially inside, as can be seen in FIG. 5, in relation to the resetting spring 38 (outside centering/inside centering). As can be taken from FIGS. 2 to 4, several centering legs 58 are provided which extend over the resetting spring 38 starting from its end. The described centering legs 57, 58 achieve a defined centering of the piston resetting spring 38 in relation to the stepped piston 50. However, axial cohesion between stepped piston 50 and resetting spring 38 does not exist.

In particular FIGS. 3 and 4 make it apparent how the support legs 55 and the centering legs 57, 58 in the preferred embodiment are arranged alternately in a circumferential direction. The centering legs 57, 58 are annularly interconnected by means of webs 66 to 71. For a defined support 54, it is preferred to arrange for three support legs 55 and three centering legs 57, 58 in each case. This achieves a non-shaky support or centering. The result is that the spring cage 53 can have a total of nine differently arranged, separate legs. The legs are made by punching, cutting out as a jog, stamping or deepdrawing together with a bowl-shaped dome for the accommodation of a resetting spring 61 out of an originally plane and circular sheet-metal blank of a constant thickness.

The centering legs 58 for the piston resetting spring 38 as well as the centering legs 57 for the spring cage 53 are in each case arranged at right angles (orthogonally) relative to the support legs 55. The centering legs 58 for the piston resetting spring 38 and, further, the centering legs 57 for the spring cage 53, point into diametrically opposite directions. This allows shaping the spring cage 53 as an integral sheet-metal shaped part in a low-cost manner.

As can further be seen from the Figures, a valve member 59 has a ball-type or plate-type design. It is integrated within the stepped bore 56 of the stepped piston 50 and aligned coaxially to said bore 56. Within bore 56 the stepped piston 50 further has a conical valve seat 60 which is provided at an axial distance from support 54 and completely integrated. The valve member 59 is permanently acted upon by a resetting spring 61 in the valve closing direction in such a fashion that it is basically seated on the valve seat 60. For this purpose, the resetting spring 61 is supported on the spring cage 53 in the area of the perforated bottom 62. The so formed non-return valve serves for the ventilation of the displacement chamber 24 in the sense of a suction valve function because it is suitable to connect the displacement chamber 24 temporarily to the pressure fluid inlet E depending on the prevailing pressure conditions.

A pump cartridge which is thereby created and allows being handled independently can be taken from FIGS. 2 and 5 and comprises stepped piston 50, bushing 18, resetting spring 38, spring cage 53 with suction valve, and the sealing assembly 26. In this arrangement, the bushing 18 at one end is provided with a stop 63 for the stepped piston 50, and the stop 63 in a radial direction is designed to be smaller than the diameter of the stepped piston 50, while at the opposite end of the bushing 18 the abutment 41 is attached for the firm support of the piston resetting spring 38.

In the capacity of a subassembly, the pump cartridge can be mounted simply into the accommodating member 3 by slipping it onto a closing element 42, 43 and introducing it together with the sealing assembly 28 into the stepped bore 39, 40. Because an inside centering between stepped piston 50 and spring cage 53 exists in the embodiments of the invention, the space that remains radially outwards can be used for the defined, space-saving support of the piston resetting spring 38. Therefore, the embodiment is particularly well suited for piston pumps having a large piston cross-section. As the mean diameter of the support 54 on the stepped piston 50 corresponds essentially with the diameter of the piston resetting spring 38, it is rendered possible to design the support legs 55 in conformity with stress. The reason is that combined pressure and bending forces are prevented from being introduced. Consequently, a better fatigue strength of the piston pump is achieved.

Figure 6:
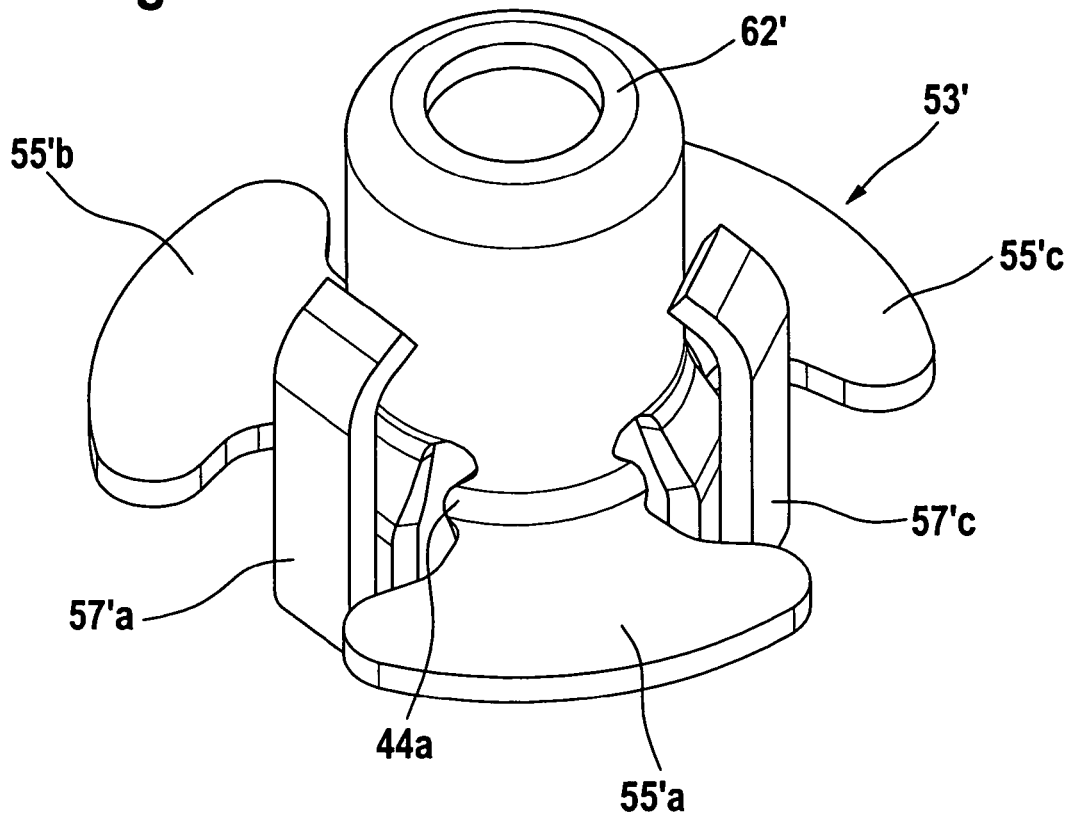
FIG. 6 shows an enlarged perspective view of a spring retainer of the pump according to FIG. 5.
Figure 7:
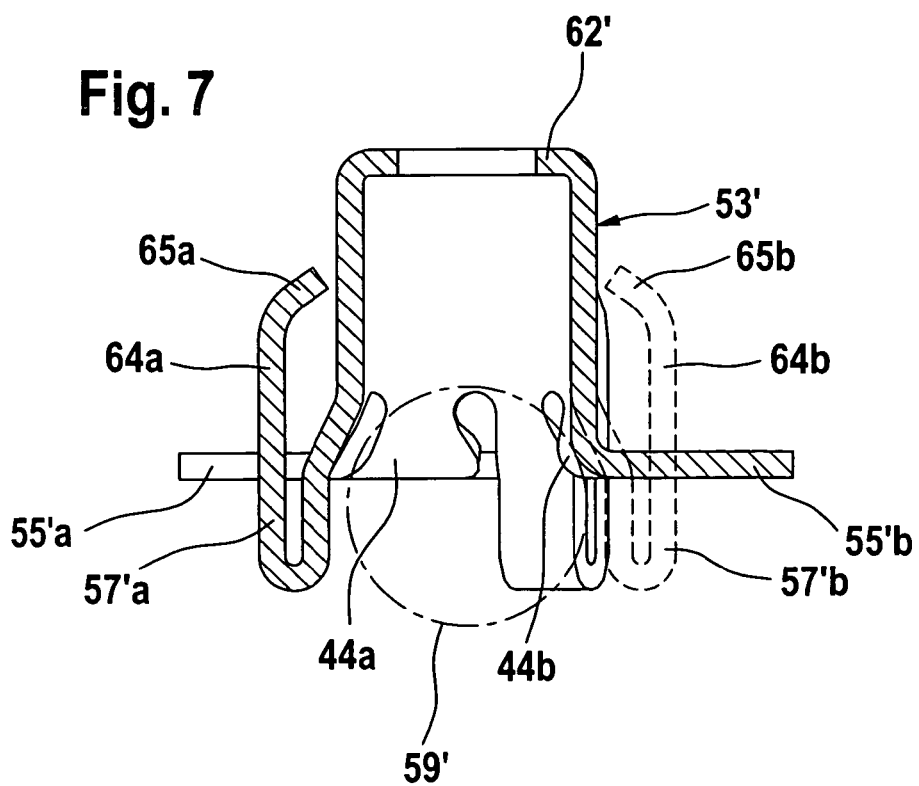
FIG. 7 shows an enlarged cross-section taken through a spring retainer.

The features are additionally characterized by an apostrophe in FIGS. 5 to 7. Only basic differences will be dealt with in the following because the preferred embodiment according to FIGS. 5 to 7 corresponds largely with the previously explained embodiment according to FIGS. 2 to 4. This design is predominantly appropriate for greatly miniaturized piston pumps with a relatively small piston cross-section, wherein the material of the spring cage 53', starting from a perforated bottom 62', initially has a cylindrical bowl-shaped design and is equipped with radially directed support legs 55a,b,c' for the support 54'.

The support legs 55a,b,c' are distributed regularly over the periphery of the spring cage 53'. Preferably three support legs 55a,b,c' being at angles relative to each other are provided at the periphery. The surface of the support legs 55a,b,c' is configured like a cloverleaf, and this support surface extended like a cloverleaf allows a reduced surface pressure, while the utilization of the sheet-metal material is improved.

In the variant according to FIGS. 5 to 7 the centering legs 57a,b,c' for the spring cage 53' fulfill a double function by being configured in such a manner that they additionally achieve a centering of the piston resetting spring 38. This goal is achieved because the centering legs 57a,b,c' are bent like a U by 180° in the cross-section as apparent from FIG. 7 so that each centering leg 57a,b,c' has a resiliently elastic spring portion 64 which extends substantially in parallel to the bowl used for the accommodation of the resetting spring 61'. The resiliently elastic leg portion 64 thereby allows an improved clamping effect of the spring cage 53' on the stepped piston 50'. To improve mounting by means of machines, the resiliently elastic leg portion 64 at its end is bent at right angle with a slope 65 radially inwards, that is, in the direction of the bowl. This slope 65 facilitates slipping the piston resetting spring 38 mechanically onto the centering legs 57a,b,c'. A self-centering process during the slipping operation is also rendered possible when the centering legs 57a,b,c' are immersed into the interior of the spring.

It is advisable that the different legs of each spring cage 53, 53' extend in parallel alongside a joint axial longitudinal axis. This renders it possible to manufacture the pairs of legs in almost one operation. The manufacture of the spring cage 53, 53' takes place in steps because a bowl with a bowl collar and the bottom 62, 62' to be perforated is deepdrawn in several first steps. Subsequently, the individual legs are punched out and bent including re-bending operations that may become necessary.

Figure 8:
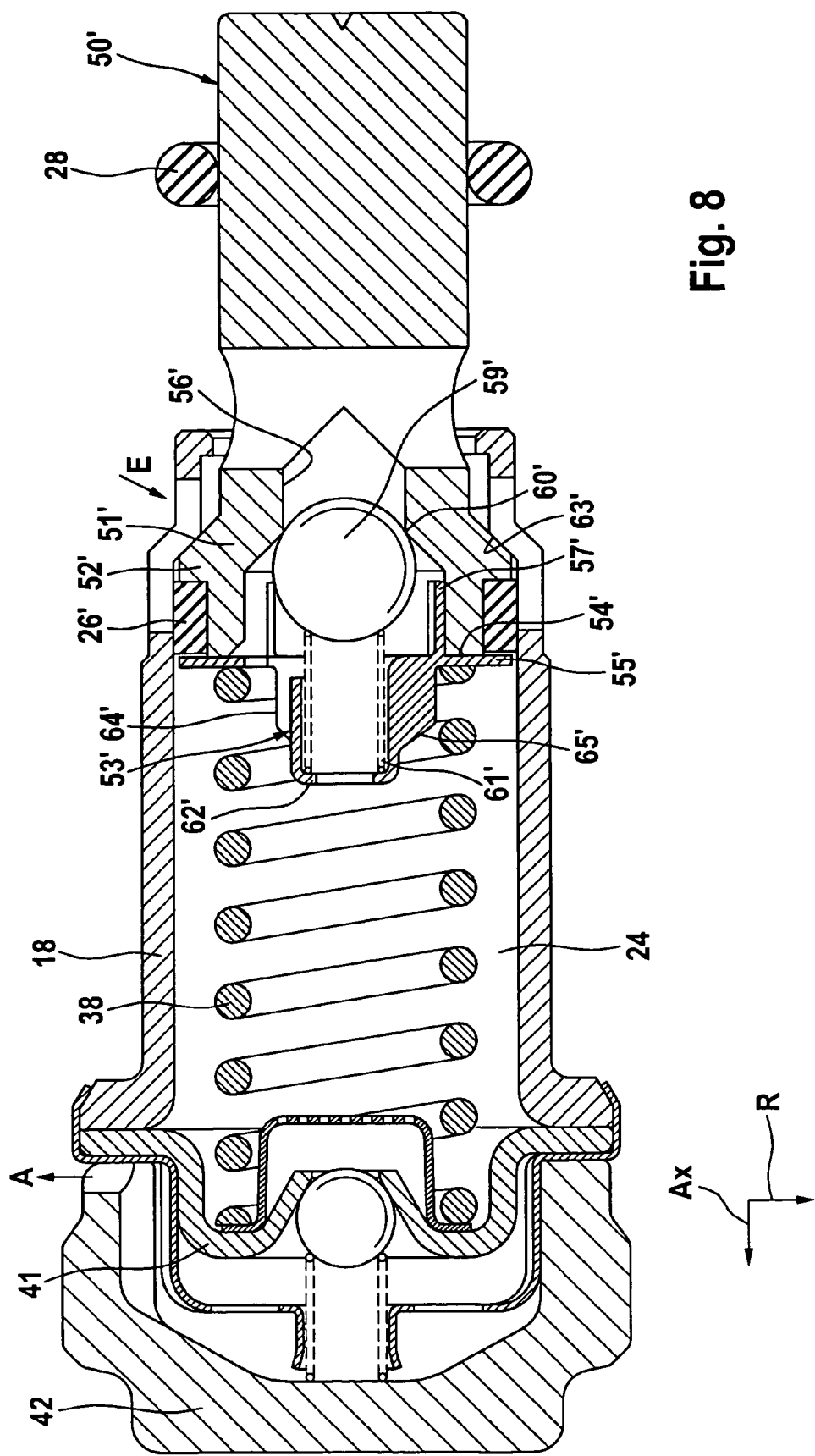
FIG. 8 Shows an enlarged cross-sectional view for small diameter pump construction.

FIG. 8 shows another embodiment for small-diameter pump constructions. With respect to the features, this embodiment is absolutely identical with the embodiment according to FIGS. 5 to 7 so that reference is made to the related description in order to avoid unnecessary repetitions. Identical features have been assigned identical reference numerals. In contrast to the embodiment according to FIGS. 5 to 7, however, the spring cage 53' is made as a part of solid material undergoing chip removal. With a corresponding preference, metal-cutting operations are consequently also possible without departing from the principal idea of the invention.

LIST OF REFERENCE NUMERALS 1 unit
2 drive
3 accommodating member
4 control unit
5 stepped bore
6 roller bearing
7 drive shaft
8 eccentric
9 crank chamber
10 piston pump
11 needle bearing
12 outside ring
13 bowl bottom
14 bottom
15 ball
16 piston
17 piston
18 bushing
19 bushing
20 end
21 end
22 end
23 end
24 displacement chamber
25 displacement chamber
26 guide ring
27 guide ring
28 sealing assembly
29 sealing assembly
30 supply chamber
31 supply chamber
32 non-return valve
33 non-return valve
34 filter
35 filter
36 non-return valve
37 non-return valve
38 piston resetting spring
39 stepped bore
40 stepped bore
41 abutment
42 closing element
43 closing element
44a,b,c; 44'a, 44'b, 44'c means
50, 50' stepped piston
51, 51' end
52, 52' step
53, 53' spring cage
54, 54' support
55a, 55b, 55c, 55'a, 55'b, 55'c support leg
56, 56' bore
57a, 57b, 57c, 57'a, 57'b, 57'c centering legs
58a, 58b, 58c, 58'a, 58'b, 58'c centering legs
59, 59' valve member
60, 60' valve seat
61, 61' resetting spring
62, 62' bottom
63, 63' stop
64 leg portion
65 slope
66-71 web
E inlet
A outlet
Ax axial direction
R radial direction

What is claimed is:

1. A piston pump (10) for supplying pressure fluid into a hydraulic consumer of an electronically controlled vehicle brake system, comprising
a stepped piston (50, 50') which is arranged in a stepped bore (39, 40) of an accommodating member (3) so as to be movable within a bushing (18, 19) in an axial direction Ax, the stepped piston (50, 50') being partly designed like a hollow tube at least at one end (51, 51'), a displacement chamber (24, 25) being limited by the end (50, 50') of the stepped piston (50, 50') and having a stepped design at its outside periphery, and carrying and centering a sealing assembly (26, 26') which is retained in the axial direction Ax by a step (52, 52') on the stepped piston (50, 50'), on the one hand, and is retained by a spring cage (53, 53'), on the other hand, the stepped piston (50, 50') including radially inwards with respect to the sealing assembly (26, 26') a plane support (54, 54') for plane support legs (55*a,b,c*; 55*a,b,c'*) of the spring cage (53, 53'), the plane support (54, 54') being provided orthogonally to the axial direction Ax, the stepped piston (50, 50') including radially inwards, with respect to the support (54, 54'), a stepped bore (56, 56'), with the bore (56, 56') accommodating centering legs (57*a,b,c*; 57*a,b,c'*) of the spring cage (53, 53'), a spring-loaded valve member (59, 59') of a non-return valve being arranged coaxially inside the stepped bore (56, 56'), which valve member serves to ventilate the displacement chamber (24, 25), a resetting spring (38) being arranged in the displacement chamber (24, 25) and supported on an abutment (41) of the bushing (18, 19), on the one hand, and on the spring cage (53, 53'), on the other hand, the bushing (18, 19) being provided at one end with a stop (63, 63') for the stepped piston (50, 50'), said stop (63, 63') in a radial direction R being smaller than the diameter of the stepped piston (50, 50'), while at the opposite end of the bushing (18, 19) at least one abutment (41) for the resetting spring (38) is attached so that stepped piston (50, 50'), resetting spring (38), non-return valve and sealing assembly (26) are arranged within the bushing (18, 19) as a subassembly that can be handled independently.

2. The piston pump as claimed in claim 1, wherein the plane support (54, 54') has a mean diameter which corresponds essentially with the diameter of the piston resetting spring (38).

3. The piston pump as claimed in claim 1, wherein the support legs (55*a*, 55*b*, 55*c*) are annularly interconnected by means of webs (66, 67, 68, 69, 70, 71).

4. The piston pump as claimed in claim 1, wherein the spring cage (53) includes additional centering legs (58*a,b,c*) for the resetting spring (38).

5. The piston pump as claimed in claim 4, wherein the centering legs (58*a,b,c*) for the resetting spring (38) and the centering legs (57*a,b,c*) for the spring cage (53) are arranged in each case at right angles relative to the support legs (55*a,b,c*).

6. The piston pump as claimed in claim 5, wherein the centering legs (57*a,b,c*) for the spring cage (53) and the centering legs (58*a,b,c*) for the resetting spring (38) point in diametrically opposed directions.

7. The piston pump as claimed in claim 4, wherein the centering legs (57*a,b,c*) for the spring cage (53) and the centering legs (58*a,b,c*) for the resetting spring (38) have a separate design, with the centering legs (57*a,b,c*) for the resetting spring (38) extending over the resetting spring (38) in a radially outward direction.

8. The piston pump as claimed in claim 1, wherein the support legs (55*a,b,c*; 55*a,b,c'*) and the centering legs (57*a,b,c*; 57*a,b,c'*) of the spring cage (53, 53') are alternately provided in a circumferential direction.

9. The piston pump as claimed in claim 8, wherein at least three support legs (55*a,b,c*; 55*a,b,c'*) and at least three centering legs (57*a,b,c*; 57*a,b,c'*) are provided in each case.

10. The piston pump (10) as claimed in claim 1, wherein the centering legs (57*a,b,c'*) for the spring cage (53') and leg portions (64*a,b,c*) for centering the resetting spring (38) are designed integrally, with the leg portions (64*a,b,c*) extending radially inwards into the helical resetting spring (38).

11. The piston pump (10) as claimed in claim 1, wherein the spring cage (53, 53') has means for (44*a,b,c*; 44*a,b,c'*) limiting an opening stroke of the valve member (59, 59').

12. The piston pump as claimed in claim 11, wherein the means (44*a,b,c*; 44*a,b,c'*) are designed as legs against which the valve member (59, 59') will bear after a defined opening stroke.

13. The piston pump as claimed in claim 12, wherein the legs are arranged so as to be distributed in a circumferential direction of the spring cage (53, 53').

14. The piston pump (10) as claimed in claim 1, wherein the spring cage (53, 53') is configured as an integral sheet-metal shaped part, in that the material of the spring cage (53, 53') has a uniform thickness, and in that the legs and the stops are provided as punched-out jogs or impressions of the sheet-metal material.

\* \* \* \* \*